(12) United States Patent
Litzen et al.

(10) Patent No.: US 6,540,027 B2
(45) Date of Patent: Apr. 1, 2003

(54) FARRIER'S TOOL

(76) Inventors: David Litzen, 7231 Tanager Dr., Rapid City, SD (US) 57702; Joseph Schneller, 2440 Wildhorse Dr., Rapid City, SD (US) 57703; Ronald Bedard, 6141 Wildwood, Rapid City, SD (US) 57702; John L. Schneller, 25151 Tooth Acres Trail, Custer, SD (US) 57730

( * ) Notice: Subject to any disclaimer, the term of this patent is extended or adjusted under 35 U.S.C. 154(b) by 0 days.

(21) Appl. No.: 10/057,032

(22) Filed: Jan. 24, 2002

(65) Prior Publication Data

US 2002/0100172 A1 Aug. 1, 2002

Related U.S. Application Data

(60) Provisional application No. 60/264,631, filed on Jan. 26, 2001.

(51) Int. Cl.$^7$ ................................................ A01L 11/00
(52) U.S. Cl. ..................................................... 168/48.1
(58) Field of Search ...................... 168/48.1, 45; 30/28, 30/29, 182, 183, 271, 312, 340, 342, 344; 7/103, 129, 130, 132, 133, 168

(56) References Cited

U.S. PATENT DOCUMENTS

| 128,642 | A | * | 7/1872 | Lyman | 168/45 |
|---|---|---|---|---|---|
| 215,100 | A | * | 5/1879 | Conarroe | 30/134 |
| 366,605 | A | * | 7/1887 | Pollard | 7/133 |
| 747,159 | A | * | 12/1903 | Flagstad | 168/45 |
| 806,144 | A | * | 12/1905 | Hopkins | 168/45 |
| 847,980 | A | | 3/1907 | Bowler | |
| 3,915,037 | A | * | 10/1975 | Wiener | 81/9.43 |
| 4,057,863 | A | * | 11/1977 | Bewley | 7/132 |
| 4,130,938 | A | * | 12/1978 | Uhlmann | 30/192 |
| 5,107,559 | A | * | 4/1992 | O'Reilley | 7/127 |
| 5,715,604 | A | * | 2/1998 | Lanzoni | 30/192 |
| 6,041,460 | A | * | 3/2000 | Cholewinski | 7/156 |

* cited by examiner

Primary Examiner—Peter M. Poon
Assistant Examiner—Son T. Nguyen
(74) Attorney, Agent, or Firm—Gene R. Woodle

(57) ABSTRACT

Embodiments of a farrier's tool are disclosed which may to trim a horse's hoof. The farrier's tool of the instant invention employs a cam which amplifies the mechanical advantage of the tool such that the operator may trim a hoof using a single hand.

16 Claims, 1 Drawing Sheet

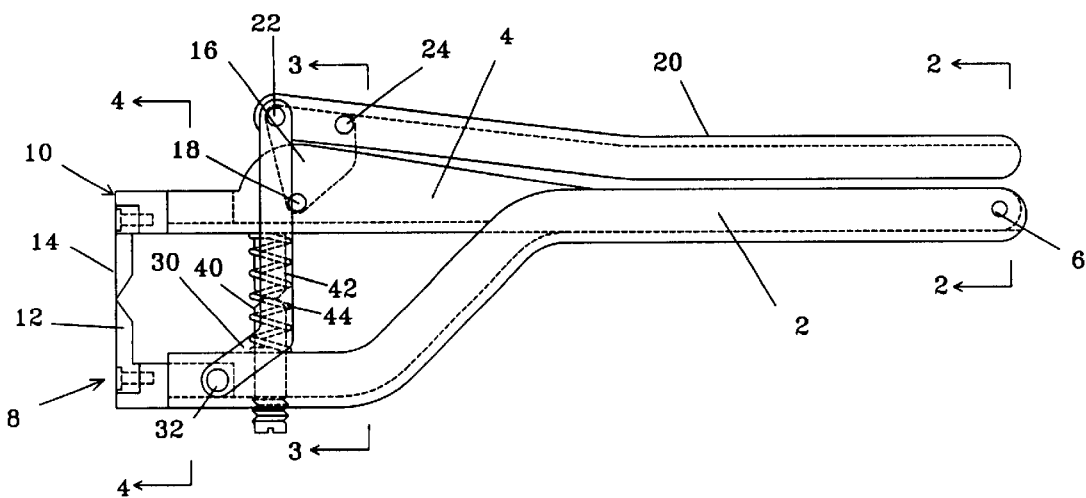
FIG. 1
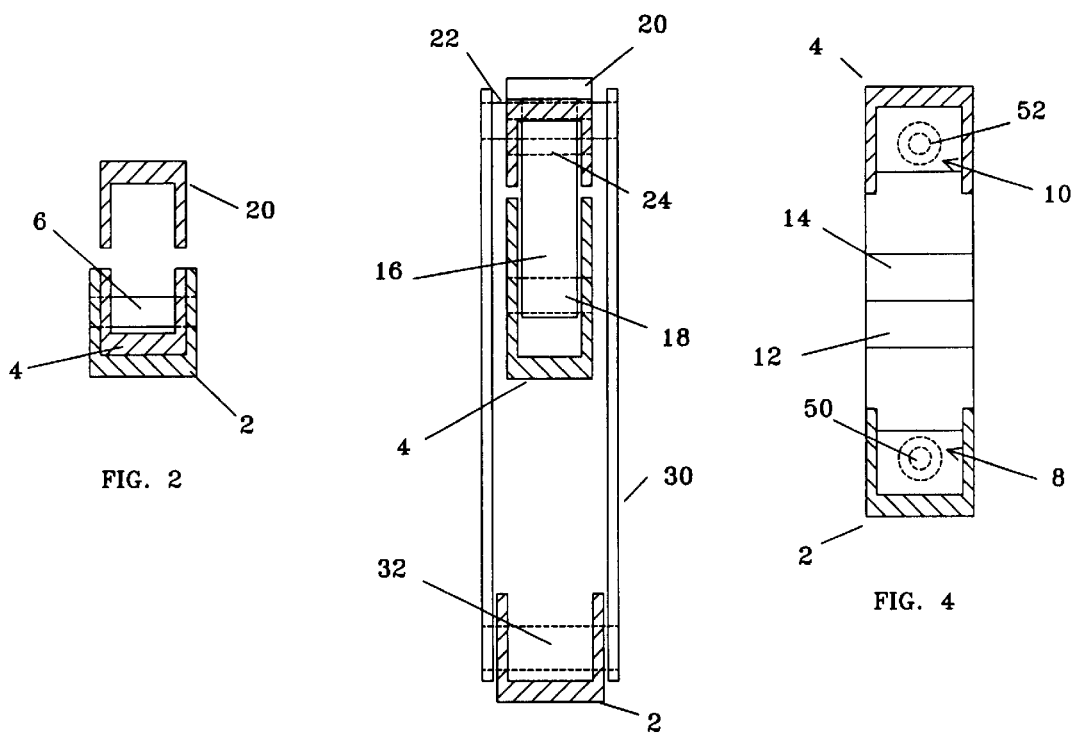
FIG. 2
FIG. 3
FIG. 4

FARRIER'S TOOL

REFERENCE TO RELATED APPLICATION

This application relies, in part, for priority upon the Provisional Patent Application filed by David Litzen et al. entitled Farrier's Tool. This Provisional Patent Application was filed Jan. 26, 2001 and assigned application No. 60/264,631.

BACKGROUND OF THE INVENTION

1. Field of the Invention

The present invention relates generally to hand operated clipping tools and more specifically to a single handed tool for trimming horse hooves.

2. Background Information

In the United States and throughout the world, thousands of people keep horses and use them for a variety of purposes including riding, showing, and as draft animals. Horses, of course, have hooves and the hooves must be maintained to prevent damage such as splitting etc. In most cases horses are shod and the person who cares for the horse's hooves and applies the horse shoes is most often referred to as a farrier.

Horse hooves grow and probably the most important aspect of hoof maintenance and preparation for shoeing is to keep the hooves trimmed. Trimming a horse hoof can be a difficult task. Horse hooves are very tough and it is physically difficult to cut through the material. In addition, horses are large animals and it is often difficult to control the animal during the trimming process.

A variety of tools have been developed and used by farriers and others to aid the hoof trimming process. The earliest tools were simple knives or saws, but a number of long handled clippers have also been invented. Such clippers ordinarily rely upon the mechanical advantage obtained when relatively long handles are connected to relatively short cutting arms by a hinge. This principal of mechanical advantage is illustrated by a pair of common pliers, for instance. The handles of the pliers move a relatively greater distance than the working arms of the pliers and, the pressure applied by the working arms of the pliers is relatively greater than the pressure applied to the handles. This principle is referred to as mechanical advantage in this application.

Known horse hoof clippers which apply the mechanical advantage described above have an inherent problem: they take two hands to operate because the distance the handles must travel to apply sufficient force to cut a hoof is greater than may be accomplished with one hand. That is, in order to provide sufficient force to trim a horse's hoof, the handles must start from a position further apart than the five or six inches which can reasonably be controlled by the span of one hand. Therefore, the farrier must use one hand on each of the handles of the tool to apply the force necessary to trim the hoof. Horses are large animals, and a farrier using both hands to operate a trimming tool often has a difficult time controlling the animal and correctly positioning the hoof for trimming. In addition, women farriers often have a difficult time operating a conventional farrier's tool because they generally have less grip strength than their male counterparts.

The invention presented in the present application is believed to solve, in a simple and effective fashion, problems which have long plagued farriers attempting to trim a horse's hoof: a farrier's tool which allows the farrier to apply sufficient force to trim the hoof with a single hand and which leaves one hand free to control the horse and properly position the hoof.

The ideal farrier's tool should provide a method by which a farrier may trim a horse's hoof using one hand. The ideal farrier's tool should also provide sufficient mechanical advantage to trim a hoof without requiring an unreasonable amount of effort. The ideal farrier's tool should also provide for a straight cut rather than the elliptical cut provided by a conventional farrier's tool. The ideal farrier's tool should also be adaptable to other uses which require a similar mechanical advantage and one handed operation. The ideal farrier's tool should also be simple, rugged, inexpensive, and easy to use.

SUMMARY OF THE INVENTION

The farrier's tool of the instant invention employs the mechanical advantage of having a pair of handles which are hinged such that they are relatively longer than the cutting arms of the tool. In addition, the farrier's tool incorporates a cam which increases the mechanical advantage so that the tool may apply sufficient pressure to trim a horse's hoof with the operator using a single hand. That is, even though the handles move only the five or six inches which may be spanned by a single hand, sufficient force is applied to trim the hoof. A conventional farrier's tool is like a pair of pliers in that it is a machine which uses a single fulcrum or pivot point. The cam of the instant invention is actually a part of a double fulcrum device. By employing a double fulcrum or two pivot point configuration, the farrier's tool of the instant invention provides approximately twice the mechanical advantage of a single fulcrum machine.

A bottom handle is provided which is bent such that the cutting end of the bottom handle is lower than the handle end of the bottom handle. A straight lever having the same length as the bottom handle is rotatably connected to the handle end of the bottom handle by a hinge pin. A bottom cutting assembly protrudes upward from the cutting end of the bottom handle and a top cutting assembly protrudes downward from the cutting end of the lever such that a bottom cutting blade in the bottom cutting assembly meets a top cutting blade in the top cutting assembly when the farrier's tool is in a closed position. For purposes of this application, the cutting end of the farrier's tool is referred to as the forward end and the handle end is referred to as the rearward end.

A cam having a generally triangular shape is also provided. One vertex of the cam is rotatably attached to the lever rearward of the top cutting assembly by means of a lever cam pin through the lever. The forward end of a top handle is rotatably affixed to the top forward vertex of the cam by means of a forward top handle cam pin. Rearward of the forward top handle cam pin, the top handle is also affixed to the top rearward vertex of the cam by a rearward top handle cam pin. The use of the rearward top handle cam pin in the preferred embodiment of the instant invention is to provide stability to the device, but a cam rotatably affixed at just two points, at the lever cam pin and the forward top handle cam pin, would also work.

The lower end of a control arm is rotatably affixed to the bottom handle by a control arm pin just rearward of the bottom cutting assembly. The upper end of the control arm is rotatably affixed to the forward top handle cam pin. A spring is interposed between the bottom handle and the lever just rearward of the cutting assemblies which tends to force the cutting assemblies and the bottom handle and the top handle apart.

In operation, the spring forces the top and bottom handles apart until they reach a maximum separation of the usual span of a single hand. The portion of the hoof to be trimmed is placed between the now separated blades of the cutting assemblies and the tool closed by the operator forcing the top handle toward the bottom handle. Because the mechanical advantage of having longer handles than cutting arms is amplified by the action of the cam, the farrier can apply sufficient force to cut through the hoof material using a single hand.

Although the farrier's tool of the instant invention is described above as having cutting blades and cutting assemblies, the tool could also be adapted for additional uses. For example, by replacing the cutting assemblies with punch type heads, the device could be used for placing ear tags on cattle.

One of the major objects of the present invention is to provide a farrier's tool which may be used to trim a horse's hoof using a single hand.

Another objective of the present invention is to provide a farrier's tool with which a horse's hoof may be trimmed using a single hand without requiring the application of an unreasonable amount of force with a single hand.

Another objective of the present invention is to provide a farrier's tool which provides for a straight cut rather than the elliptical cut provided by a conventional farrier's tool.

Another objective of the present invention is to provide a farrier's tool which may be adapted to other uses which require a similar mechanical advantage and one handed operation.

Another objective of the present invention is to provide a farrier's tool which is simple, rugged, inexpensive, and easy to use.

These and other features of the invention will become apparent when taken in consideration with the following detailed description and the drawings.

BRIEF DESCRIPTION OF THE DRAWINGS

FIG. 1 is a side view of the farrier's tool of the instant invention;

FIG. 2 is a sectional view of the farrier's tool of the instant invention taken along line 2—2 of FIG. 1;

FIG. 3 is a sectional view of the farrier's tool of the instant invention taken along line 3—3 of FIG. 1; and FIG. 4 is a sectional view of the farrier's tool of the instant invention taken along line 4—4 of FIG. 1.

DESCRIPTION OF A PREFERRED EMBODIMENT

Referring to the drawings, FIGS. 1 through 4, there is shown a preferred form of the farrier's tool embodying the present invention. The farrier's tool of the instant invention may be used by a farrier to trim a horse's hoof using a single hand. The instant invention provides sufficient mechanical advantage to trim the hoof without requiring an undue application of force with a single hand.

Referring to FIG. 1, a side view of the farrier's tool of the instant invention is shown. A bottom handle 2 is provided which is bent such that the handle (rearward) end of the bottom handle 2 is higher than the cutting (forward) end of said bottom handle 2. A lever 4 is rotatably affixed to the rearward end of said bottom handle 2 by a hinge pin 6. The lever 4 is of sufficient length that the forward end of said lever 4 ends at the same point as the forward end of said bottom handle 2. A bottom cutting assembly 8 protrudes upward from the forward end of said bottom handle 2 and a top cutting assembly 10 protrudes downward from the forward end of said lever 4. The bottom cutting assembly 8 includes a bottom cutting blade 12 and the top cutting assembly 10 includes a top cutting blade 14 which are sharp and which meet when the farrier's tool is in a closed position.

Still referring to FIG. 1, a cam 16 is provided which has a generally triangular shape. The bottom vertex of the cam 16 is rotatably affixed to said lever 4 by a lever cam pin 18 through said lever 4 which is rearward of said top cutting assembly 10. A top handle 20 is rotatably affixed to the top forward vertex of said cam 16 by means of a forward top handle cam pin 22. Rearward of the forward top handle cam pin 22, the top handle 20 is also affixed to the top rearward vertex of said cam 16 by means of a rearward top handle cam pin 24. The top rearward vertex of said cam 16 is affixed to said top handle 20 by the rearward top handle cam pin 24 in this preferred embodiment of the farrier's tool of the instant invention for added stability, but the device would work using a cam without this connection and only the rotating connections provided by said forward top handle cam pin 22 and said lever cam pin 18. Said top handle 20 is of sufficient length that, with the farrier's tool in the closed position, the rearward end of said top handle 20 reaches as far rearward as the rearward end of said bottom handle 2.

Still referring to FIG. 1, a control arm 30 is rotatably affixed to said bottom handle 2 at its bottom end by means of a control arm pin 32 through said bottom handle 2 rearward of said bottom cutting assembly 8 and forward of said forward top handle cam pin 22. The top end of the control arm 30 is also affixed to said forward top handle pin 22. A bottom spring pin 40 is threaded and protrudes upward from said bottom handle 2 rearward of said bottom cutting assembly 8 through a threaded hole 41 and a complementary top spring pin 42 protrudes downward from the complimentary location on the bottom of said lever 4. A spring 44 is interposed between said bottom handle 2 and said lever 4 with the top of the spring 44 fitting over the top spring pin 42 and the bottom of said spring 44 fitting over the bottom spring pin 40. Said bottom spring pin 40 has a slotted bottom and, by turning within the threaded hole 41, is adjustable up and down so that the sharp ends of said bottom cutting blade 12 and said top cutting blade 14 meet in the event that the blades are sharpened etc.

Referring now to FIG. 2, a sectional view of the farrier's tool of the instant invention taken along line 2—2 of FIG. 1 is shown. Said bottom handle 2 and said lever 4 have a channel shape with the channel opening upward. Said lever 4 fits within said bottom handle 2. Said top handle 20 also has a channel shape, but the channel opens downward. Said hinge pin 6 is firmly affixed to said bottom handle 2, but said lever 4 may rotate about said hinge pin 6.

Now referring to FIG. 3 a sectional view of the instant invention taken along line 3—3 of FIG. 1 is shown. In this view it can be seen that there are actually a pair of control arms 30 which are affixed to said control arm pin 32 outside of said bottom handle 2. Said control arm pin 32 may rotate within a hole through said bottom handle 2. In this view it can be seen that said forward top handle cam pin 22 is affixed to the tops of the pair of control arms 30. Said forward top handle cam pin 22 further fits through holes in the forward end of said top handle 20 and in the top forward vertex of said cam 16. Said cam 16 fits within the channels of said top handle 20 and said lever 4. Said rearward top handle cam pin 24 is affixed to said top handle 20 and said cam 16 may rotate about said rearward top handle cam pin 24 by means of a hole through the top rearward vertex of said cam 16. Said lever arm cam pin 18 is affixed to said lever 4 and said cam 16 may rotate about said lever arm cam pin 18 by means of a hole through the bottom vertex of said cam 16.

Now referring to FIG. 4, a sectional view of the farrier's tool of the instant invention taken along line 4—4 is shown. The rearward end of said bottom cutting assembly 8 fits within the channel of said bottom handle 2 and is affixed by welding or some other appropriate means. The rearward end of said top cutting assembly 10 fits within the channel of said lever 4 and is affixed by welding or some other appropriate means. Said bottom cutting blade 12 is affixed to said bottom cutting assembly 8 by means of a bolt 50 which may be screwed into a tapped hole in the forward end of said bottom cutting assembly 8. Said top cutting blade 14 is affixed to said top cutting assembly 10 by means of a top bolt 52 which may be screwed into a tapped hole in the forward end of said top cutting assembly 10. Thus, the cutting blades may be removed for sharpening or replacement.

In operation, said spring 44 tends to force said bottom handle 2 and said top handle 20 apart. The farrier's tool of the instant invention is configured such that the maximum spread of said bottom handle 2 and said top handle 20 is the comfortable span of a single hand. The action of said spring 44 also tends to force said bottom cutting blade 12 and said top cutting blade 14 apart. The farrier's tool of the instant invention is configured such that when said bottom handle 2 and said top handle 20 are at there maximum spread, said bottom cutting blade 12 and said top cutting blade 14 are of sufficient distance apart that the portion of the horse's hoof to be clipped by be placed between the cutting blades. The operator may use one hand to control the animal or properly position the hoof for trimming. The operator holds the farrier's tool in the other hand and squeezes said bottom handle 2 and said top handle 20 together. This forces said bottom cutting blade 12 and said top cutting blade 14 together with sufficient force to trim the hoof. The action of said cam 16 amplifies the mechanical advantage of having longer handles than cutting arms and provides sufficient force that the movement of the handles through the distance which may be comfortably spanned by a single hand is sufficient to provide sufficient force at the cutting edges to trim the hoof without requiring undue pressure of a single hand.

Although the farrier's tool of the instant invention is described above as having cutting assemblies and cutting blades, the device could easily be adapted to uses which require other head assemblies. For example, heads having a configuration similar to those in a paper punch could be to said bottom handle 2 and said lever 4.

In the preferred embodiment of the farrier's tool of the instant invention, all parts and elements, except those specifically mentioned below, are made from steel; but other materials having the same strength, weight, resistance to oxidation, etc. could be used. All firmly affixed parts and elements, except those specifically described above, are welded. Said bottom cutting blade 12 and said top cutting blade 14 may be made from a tungsten/steel alloy or some other material which is hard enough to maintain a sharp edge through repeated use.

While preferred embodiments of this invention have been shown and described above, it will be apparent to those skilled in the art that various modifications may be made in these embodiments without departing from the spirit of the present invention.

We claim:

1. A cutting implement having a cutting end at its forward end and a handle end at its rearward end and having a top and a bottom, and capable of being operated one handed which comprises;
    (1) a bottom handle bent near its middle such that the forward end is lower than the rearward end, the bottom handle having a cutting blade protruding upward from its forward end and having a hinge at its rearward end;
    (2) a lever being rotatably affixed to said bottom handle at its rearward end at the hinge on said bottom handle, the lever having a cutting blade protruding downward from its forward end such that the sharp end of the cutting blade on said bottom handle meets the sharp end of the cutting blade on said lever;
    (3) a control arm rotatably affixed to said bottom handle just rearward of the cutting blade on said bottom handle, the control arm being of sufficient length that it may protrude upward above said lever;
    (4) a top handle positioned above said lever and being rotatably affixed to the end of said control arm opposite said bottom handle, the top handle being of sufficient length that the rearward end of said top handle ends near the rearward end of said bottom handle; and
    (5) a cam having two pivot points and being rotatably affixed at each of the two pivot points, one of the two pivot points being at the same point where said top handle is rotatably affixed to said control arm, the other of the two pivot points being a rotatable connection with said lever rearward of the the cutting blade on said lever;

whereby the cam gives a mechanical advantage to an operator such that the operator may use the cutting implement with one hand to cut materials which would ordinarily require two hands to cut.

2. The cutting implement of claim 1 in which spring means is interposed between said bottom handle and said lever such that the spring means tends to push the cutting blades apart.

3. The cutting implement of claim 2 in which adjustable stop means is interposed between said bottom handle and said lever such that the stop means prevents said bottom handle and said lever from closing beyond the point at which the ends of the two cutting blades just touch and said stop means may be adjusted to accommodate changes of length in the two cutting blades which may occur because of sharpening.

4. The cutting implement of claim 3 in which the two cutting blades are removably affixed to said bottom handle and said lever and may be replaced.

5. The cutting implement of claim 4 in which the two cutting blades are replaced by a punch attachment.

6. The cutting implement of claim 3 in which the two cutting blades are replaced by a punch attachment.

7. The cutting implement of claim 2 in which the two cutting blades are removably affixed to said bottom handle and said lever and may be replaced.

8. The cutting implement of claim 7 in which the two cutting blades are replaced by a punch attachment.

9. The cutting implement of claim 2 in which the two cutting blades are replaced by a punch attachment.

10. The cutting implement of claim 1 in which adjustable stop means is interposed between said bottom handle and said lever such that the stop means prevents said bottom handle and said lever from closing beyond the point at which the ends of the two cutting blades just touch and said stop means may be adjusted to accommodate changes of length in the two cutting blades which may occur because of sharpening.

11. The cutting implement of claim 10 in which the two cutting blades are removably affixed to said bottom handle and said lever and may be replaced.

12. The cutting implement of claim 11 in which the two cutting blades are replaced by a punch attachment.

13. The cutting implement of claim 10 in which the two cutting blades are replaced by a punch attachment.

14. The cutting implement of claim 1 in which the two cutting blades are removably affixed to said bottom handle and said lever and may be replaced.

15. The cutting implement of claim 14 in which the two cutting blades are replaced by a punch attachment.

16. The cutting implement of claim 1 in which the two cutting blades are replaced by a punch attachment.

* * * * *